US008721976B2

(12) United States Patent
Sahara (10) Patent No.: US 8,721,976 B2
(45) Date of Patent: May 13, 2014

(54) DIESEL EXHAUST GAS PURIFICATION CATALYST AND DIESEL EXHAUST GAS PURIFICATION SYSTEM

(75) Inventor: Yukiko Sahara, Kakegawa (JP)

(73) Assignee: Cataler Corporation, Shizuoka (JP)

(*) Notice: Subject to any disclaimer, the term of this patent is extended or adjusted under 35 U.S.C. 154(b) by 88 days.

(21) Appl. No.: 13/101,901

(22) Filed: May 5, 2011

(65) Prior Publication Data

US 2011/0203264 A1    Aug. 25, 2011

Related U.S. Application Data

(63) Continuation of application No. PCT/JP2009/069008, filed on Nov. 6, 2009.

(30) Foreign Application Priority Data

Nov. 6, 2008  (JP) ................... 2008-285544

(51) Int. Cl.
*B01D 50/00* (2006.01)

(52) U.S. Cl.
USPC .......................................... 422/177

(58) Field of Classification Search
CPC .............. F01N 3/0814; B01D 53/9477; B01D 53/9472; B01D 2255/9207; B01D 2555/908; B01D 2255/91; B01J 2523/828; B01J 2523/37016; B01J 2523/00
USPC .......................... 422/171, 177, 180
See application file for complete search history.

(56) References Cited

U.S. PATENT DOCUMENTS

| 2002/0031452 | A1  | 3/2002  | Okamoto et al. |
| 2002/0187893 | A1  | 12/2002 | Yamada et al. |
| 2004/0209770 | A1* | 10/2004 | Nakatsuji ............... 502/302 |
| 2005/0031501 | A1  | 2/2005  | Kawai et al. |
| 2006/0270549 | A1* | 11/2006 | Sato et al. .............. 502/302 |
| 2007/0269353 | A1* | 11/2007 | Li et al. ................. 422/176 |
| 2008/0034740 | A1  | 2/2008  | Strehlau et al. |

FOREIGN PATENT DOCUMENTS

| CN | 1330978 A    | 1/2002 |
| CN | 1807260 A    | 7/2006 |
| EP | 0 992 276    | 4/2000 |
| EP | 1 241 329    | 9/2002 |
| JP | 2002-021538 A | 1/2002 |
| JP | 2002-079106 A | 3/2002 |
| JP | 2004-043226 A | 2/2004 |

(Continued)

OTHER PUBLICATIONS

Supplemental European Search Report and European Search Opinion issued Aug. 3, 2012 in connection with European Patent Application No. 09824862.8.

(Continued)

*Primary Examiner* — Tom Duong
(74) *Attorney, Agent, or Firm* — John P. White; Cooper & Dunham LLP (57) ABSTRACT

A diesel exhaust gas purification catalyst contains a substrate, and a catalyst layer formed on the substrate. The catalyst layer contains a carrier, a noble metal and/or an oxide thereof supported by the carrier, and a composite oxide of cerium and one or more Group III and/or Group IV elements. The diesel exhaust gas purification catalyst when in use is disposed on an upstream side of an exhaust gas stream with respect to a denitration catalyst.

10 Claims, 3 Drawing Sheets

(56) References Cited

FOREIGN PATENT DOCUMENTS

| | | |
|---|---|---|
| JP | 2004-181430 A | 7/2004 |
| JP | 2006-205002 A | 8/2006 |
| JP | 2008-229546 A | 10/2008 |
| JP | 2009-221913 A | 10/2009 |

OTHER PUBLICATIONS

Anonymous. (2004). *Catalyst Utilization Dictionary*, Kogyo Chosakai Publishing Co., Ltd., Japan, pp. 794-799.

International Search Report mailed Feb. 2, 2010, for PCT Application No. PCT/JP2009/069008, two pages.

Chinese official action (and English translation thereof) issued Feb. 4, 2013 by the Chinese Patent Office, in connection with Chinese Patent Application No. 200980144466.6.

International Preliminary Report on Patentability issued Jun. 21, 2011 in connection with PCT/JP2009/069008, filed Nov. 6, 2009.

Chinese official action (and English translation thereof) issued Aug. 13, 2013 by the Chinese Patent Office, in connection with Chinese Patent Application No. 200980144466.6.

* cited by examiner

DIESEL EXHAUST GAS PURIFICATION CATALYST AND DIESEL EXHAUST GAS PURIFICATION SYSTEM

CROSS-REFERENCE TO RELATED APPLICATIONS

This is a Continuation Application of PCT Application No. PCT/JP2009/069008, filed Nov. 6, 2009, which was published under PCT Article 21(2) in Japanese.

This application is based upon and claims the benefit of priority from prior Japanese Patent Application No. 2008-285544, filed Nov. 6, 2008, the entire contents of which are incorporated herein by reference.

BACKGROUND OF THE INVENTION

1. Field of the Invention

The present invention relates to a technique for exhaust gas purification.

2. Description of the Related Art

In recent years, exhaust gas regulations for automobiles and the like have been enforced. To cope with these regulations, various exhaust gas purification catalysts which are configured to efficiently remove hydrocarbons (HC), carbon monoxides (CO), nitrogen oxides ($NO_x$) and the like in exhaust gas have been developed (see, for example, Non-patent Document 1).

However, conventional exhaust gas purification catalysts may not achieve sufficient purification performance for exhaust gas such as $NO_x$.

PRIOR ART DOCUMENTS

Non-Patent Documents

Non-patent Document 1: "Catalyst Utilization Dictionary", Editorial Board of Catalyst Utilization Dictionary ed., Kogyo Chosakai Publishing Co., Ltd. (2004), PP. 794-799

BRIEF SUMMARY OF THE INVENTION

An object of the present invention is to achieve excellent exhaust gas purification performance, and especially to achieve excellent $NO_x$ purification performance.

According to a first aspect of the present invention, there is provided a diesel exhaust gas purification catalyst, comprising: a substrate; and a catalyst layer formed on the substrate, the catalyst layer comprising a carrier, a noble metal and/or an oxide thereof supported by the carrier, and a composite oxide of cerium and one or more Group III and/or Group IV elements, wherein the catalyst when in use is disposed on an upstream side of an exhaust gas stream with respect to a denitration catalyst.

According to a second aspect of the present invention, there is provided a diesel exhaust gas purification system, comprising: the diesel exhaust gas purification catalyst according to the first aspect; and a denitration catalyst to which exhaust gas that has passed through the diesel exhaust gas purification catalyst is fed.

DETAILED DESCRIPTION OF THE INVENTION

The inventors have made intensive studies aiming at solving the problems mentioned above. During the process therefore, the inventors have found that a denitration catalyst for purifying $NO_x$ may not achieve sufficient $NO_x$ purification performance at a temperature lower than a certain temperature (hereinafter referred to as an activation temperature; for example, about 200° C.). Namely, the inventors have found that when a diesel engine in which the temperature of exhausted gas emitted therefrom is relatively low is used, a denitration catalyst is not likely to achieve sufficient $NO_x$ purification performance. Therefore, the present inventors have developed a diesel exhaust gas purification catalyst focusing on the following points. As a result, the present inventors have obtained an idea of disposing a catalyst comprising a composite oxide of cerium and one or more Group III and/or Group IV elements on the upstream side of an exhaust gas stream with respect to a denitration catalyst.

Cerium has a property that its ion valency is readily varied as compared to other elements. Therefore, the valency tends to be varied between $Ce^{3+}$ and $Ce^{4+}$, for example, in cerium oxide. Therefore, cerium oxide causes the following reactions in accordance with the variation of the concentration of surrounding oxygen.

$$2CeO_2 \rightarrow Ce_2O_3 + \tfrac{1}{2}O_2 \tag{1}$$

$$Ce_2O_3 + \tfrac{1}{2}O_2 \rightarrow 2CeO_2 \tag{2}$$

Namely, when the concentration of surrounding oxygen is low, oxygen is released by the reaction of (1). On the other hand, when the concentration of surrounding oxygen is high, oxygen is absorbed by the reaction of (2). Thus, cerium oxide has a performance of adjusting the concentration of surrounding oxygen by releasing and absorbing oxygen reversibly. This performance is generally referred to as oxygen storage capacity.

Cerium oxide has a crystal structure in which atoms are packed densely. Therefore, it is considered that diffusion of oxygen in the crystal is hard to occur. Therefore, the storage and release of oxygen is expected to occur only around the surface of cerium oxide.

Therefore, a composite oxide of cerium oxide and other metal oxide has been conventionally used as an oxygen storage material. In such composite oxide, relatively large gaps are formed in the crystal due to the different sizes of the atoms of cerium and other metal elements. Therefore, it is considered that diffusion of oxygen in the crystal occurs more easily as compared to cerium oxide. Accordingly, it is expected that not only the vicinity of the surface of the crystal but also the inside of the crystal contribute to the storage and release of oxygen.

In the present embodiment, as mentioned above, a composite oxide of cerium and one or more Group III and/or Group IV elements is used. It is considered that the Group III and/or Group IV elements are strongly bound to oxygen. Furthermore, it is expected that the Group III and/or Group IV elements cause less valency variation as compared to cerium. Therefore, in a low temperature region where heat energy is small (for example, a temperature region whose temperature being lower than the activation temperature), it is expected that the reaction for releasing oxygen that corresponds to the (1) is relatively hard to occur. Namely, it is considered that oxygen is readily retained in the crystal at a low temperature region in the composite oxide used in the present embodiment.

At least a part of the elements bound to the stored oxygen has a 4f orbital and/or a 5d orbital having high electron-acceptability. Namely, at least a part of these elements has a 4f orbit and/or a 5d orbital that is not occupied by electrons or is occupied only by an unpaired electron. Furthermore, it is considered that the orbital occupied by the electrons possessed by $NO_x$ can form a bonding molecular orbital between these orbitals. Therefore, in this case, the element may act as an adsorbing site for adsorbing $NO_x$. Namely, it is considered that this composite oxide may act as a $NO_x$ storage material at a low temperature region.

On the other hand, it is considered that the stored oxygen is released from the composite oxide at a high temperature region at which heat energy is high (for example, a temperature region whose temperature being the activation temperature or higher). Therefore, it is expected that the valency of the elements that are bound to the oxygen is decreased and the electron-acceptability thereof is also decreased. Namely, it is expected that the binding between these elements and $NO_x$ becomes relatively weak. Furthermore, at the high temperature region, the heat oscillation of the adsorbed $NO_x$ also becomes active. Therefore, it is considered that this composite oxide releases not only the stored oxygen but also the adsorbed $NO_x$ at the high temperature region.

As mentioned above, it is expected that the composite oxide of the present embodiment has a function to adsorb $NO_x$ at a low temperature region (for example, a temperature region whose temperature being lower than the activation temperature) and to release $NO_x$ at a high temperature region (for example a temperature region whose temperature being the activation temperature or higher). Therefore, the present inventors conceived that the problems of the denitration catalyst can be eliminated by disposing a catalyst comprising this composite oxide on the upstream side of an exhaust gas stream with respect to the denitration catalyst.

Namely, when the temperature of exhaust gas is low, the $NO_x$ in the exhaust gas is adsorbed on the catalyst disposed on the upstream side. Then, when the temperature of the exhaust gas is raised, the $NO_x$ adsorbed on the catalyst disposed on the upstream side is released and flown into the denitration catalyst disposed on the downstream side. Namely, the exhaust gas at a relatively high temperature, for example, at a temperature being the activation temperature or higher is mainly flown into the denitration catalyst. Therefore, the denitration catalyst can exhibit excellent $NO_x$ purification performance at a broader temperature range as compared to conventional ones.

Hereinafter, the embodiments of the present invention are explained with reference to drawings. Throughout the drawings, the same reference numerals are used for constitutional elements that exhibit the same or similar function, and redundant explanations have been omitted. Furthermore, as used herein, the "composite oxide" means that a plurality of oxides form a solid solution rather than a mere physical mixture of oxides.

Figure 1:
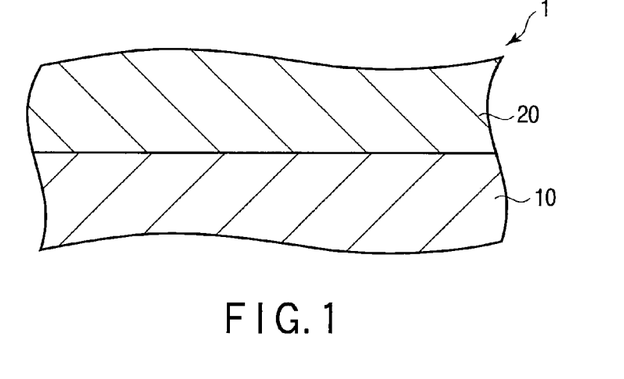
FIG. 1 is a cross-sectional view schematically showing the diesel exhaust gas purification catalyst according to an embodiment of the present invention.
Figure 2:
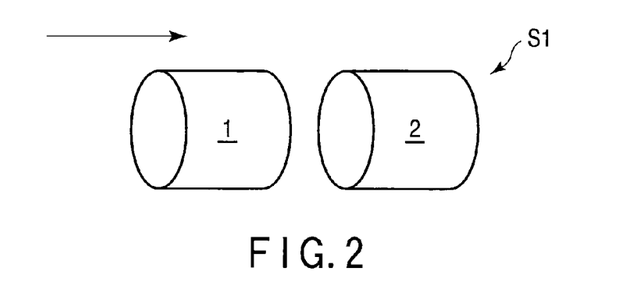
FIG. 2 is a schematic view showing an example of the diesel exhaust gas purification system using the diesel exhaust gas purification catalyst shown in FIG. 1.

FIG. 1 is a cross-sectional view schematically showing the diesel exhaust gas purification catalyst according to an embodiment of the present invention. FIG. 2 is a schematic view showing an example of the diesel exhaust gas purification system using the diesel exhaust gas purification catalyst shown in FIG. 1.

The diesel exhaust gas purification catalyst shown in FIG. 1 comprises substrate 10 and catalyst layer 20 formed on the substrate 10. The catalyst 1 is used by disposing on the upstream side of an exhaust gas stream with respect to denitration catalyst 2, shown in FIG. 2. Namely, the diesel exhaust gas purification system S1 shown in FIG. 2 comprises the catalyst 1 and the denitration catalyst 2 to which the exhaust gas that has passed through the catalyst 1 is supplied.

As the substrate 10, for example, a monolithic-honeycomb type substrate is used. Typically, the substrate 10 is made of a ceramic such as cordierite.

The catalyst layer 20 comprises a carrier, a noble metal and/or an oxide thereof supported by the carrier, and a composite oxide of cerium and one or more Group III and/or Group IV elements.

The carrier plays roles to increase the specific surface area of the noble metal and/or an oxide thereof, and to dissipate the heat generation due to the reaction to suppress the sintering of the noble metal and/or an oxide thereof. The carrier comprises, for example, at least one element selected from aluminum (Al), titanium (Ti), zirconium (Zr) and silicon (Si). Typically, oxides such as alumina, titania, zirconia and silica are used as the carrier.

The noble metal and/or an oxide thereof plays a role to catalyze a reaction for purifying exhaust gas, especially the oxidation reaction between HC and CO. As the noble metal, for example, platinum group elements such as platinum (Pt), palladium (Pd) and rhodium (Rh) are used. A plurality of kinds of elements may also be used as the noble metal.

As mentioned above, the composite oxide of cerium and one or more Group III and/or Group IV elements plays a role to adsorb $NO_x$ in the exhaust gas at a low temperature region and release $NO_x$ at a high temperature region. As is previously mentioned, the denitration catalyst 2 disposed on the downstream side of the catalyst 1 cannot exhibit excellent $NO_x$ purification performance at a temperature region lower than the activation temperature (for example, 200° C.) On the other hand, when the catalyst 1 comprising the composite oxide is disposed on the upstream side, the $NO_x$ in the exhaust gas can be retained in the catalyst 1 until the temperature of the exhaust gas becomes sufficiently high. Therefore, it is possible to improve the apparent $NO_x$ purification performance of the denitration catalyst 2.

As the Group III element included in the composite oxide other than cerium, for example, yttrium (Y), a lanthanoid and/or an actinoid is used. As the lanthanoid, for example, lanthanum (La), praseodymium (Pr) and/or neodymium (Nd) is used. As the Group IV element, for example, titanium (Ti) and/or zirconium (Zr) is used. The composite oxide may further include barium (Ba) and/or aluminum (Al).

The composite oxide is typically a composite oxide of cerium and one or more lanthanoid and/or actinoid other than cerium. For example, the composite oxide is a composite oxide of cerium and praseodymium, or a composite oxide of cerium, lanthanum and praseodymium. The ratio of cerium in the composite oxide is, for example, in the range of from 55% by mass to 95% by mass in terms of oxide, and typically in the range of from 70% by mass to 90% by mass in terms of oxide. The temperature at which release of $NO_x$ occurs can suitably be adjusted by varying the ratio. Namely, by changing this ratio, $NO_x$ can be released from the catalyst 1 at a temperature that conforms to the activation temperature of the denitration catalyst 2 that is used in combination with the catalyst 1.

The composite oxide has a specific surface area of, for example, 150 $m^2/g$ or more. The composite oxide has a specific surface area of, for example, 180 $m^2/g$ or more, typically 200 $m^2/g$ or more. Namely, the composite oxide has a relatively high specific surface area. Therefore, it has a large contact surface area with $NO_x$ in exhaust gas, and the adsorption thereof readily occurs.

The "specific surface area" can be obtained from an $N_2$ adsorption isotherm measured at 77.4 K. Specifically, at first, the amount of nitrogen gas adsorbed on active carbon (mL/mL) is measured for every pressure P (mmHg) of nitrogen gas of 77.4 K (boiling point of nitrogen) while gradually increasing the pressure P in the nitrogen gas. Then, relative pressure $P/P_0$ is obtained as a value obtained by dividing the pressure P (mmHg) by the saturated vapor pressure $P_0$ (mmHg) of the nitrogen gas, and the amount of adsorbed nitrogen gas against respective relative pressure $P/P_0$ is plotted to give an adsorption isotherm. Then, a BET plot is prepared based on this adsorption isotherm, and a BET specific surface area is determined. Thus, the above "specific surface area" is obtained.

The composite oxide may be supported by the carrier together with the noble metal and/or an oxide thereof. By doing so, the apparent specific surface area of the composite oxide can be improved. Namely, the $NO_x$ adsorption performance of the composite oxide can further be improved.

The mass ratio of the composite oxide in the catalyst layer 20 is adjusted to, for example, from 10% by mass to 85% by mass. When the amount is small, excellent $NO_x$ adsorption performance may sometimes not be achieved. When the amount is high, excellent HC and CO purification performance may sometimes not be achieved.

The catalyst layer 20 may further comprise zeolite. Zeolite has a high specific surface area and excellent adsorption performance for HC in exhaust gas. Therefore, the HC purification performance of the catalyst 1 can further be improved by incorporating zeolite. As the zeolite, for example, type-β zeolite (β zeolite), mordenite, ZSM-5, or a mixture thereof is used. The ratio of zeolite in the catalyst layer 20 is adjusted to, for example, the range of from 40% by mass to 80% by mass, typically the range of from 50% by mass to 80% by mass.

The catalyst layer 20 may further comprise a binder. The binder plays a role to improve the durability of the catalyst 1 by strengthen the binding among the carrier particles and the binding between the carrier particles and the noble metal and/or an oxide thereof. As the binder, for example, an alumina sol, a titania sol or a silica sol is used.

The catalyst layer 20 may be of a monolayer structure or of a multilayer structure.

Figure 3:
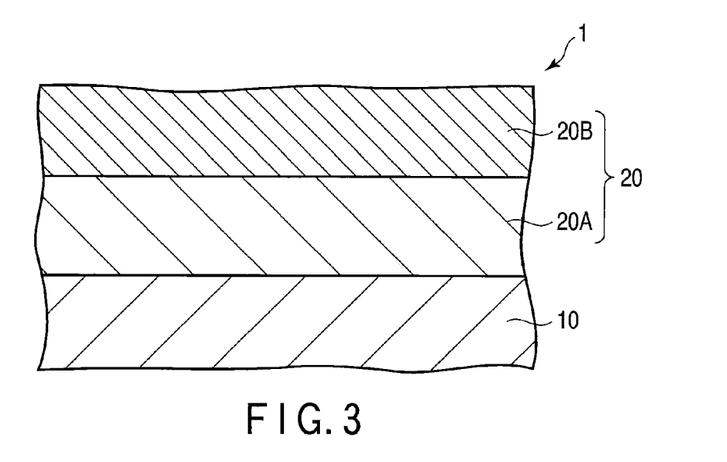
FIG. 3 is a cross-sectional view schematically showing a variation of the diesel exhaust gas purification catalyst shown in FIG. 1.

FIG. 3 is a cross-sectional view schematically showing a variation of the diesel exhaust gas purification catalyst shown in FIG. 1. The diesel exhaust gas purification catalyst 1 shown in FIG. 3 has the same constitution as the diesel exhaust gas purification catalyst shown in FIG. 1, except that the catalyst layer 20 comprises a first catalyst layer 20A formed on the substrate 10 and a second catalyst layer 20B formed on the first catalyst layer 20A.

In these catalyst layers 20A and 20B, the kinds, contents per unit surface area, etc. of the component such as the carrier, the noble metal and/or an oxide thereof, the composite oxide, zeolite and the binder differ from each other. By doing so, the $NO_x$ adsorption performance, exhaust gas purification performance of the catalyst 1, and the apparent exhaust gas purification performance of the catalyst 2 that is disposed on the downstream side of the catalyst 1 can be optimized.

The first catalyst layer 20A and the second catalyst layer 20B differ from each other in, for example, the composite oxide content in the substrate per unit volume (hereinafter also referred to as composite oxide content). When the $NO_x$ purification performance of the catalyst 1 is important, the following constitution is typically adopted. Namely, the second catalyst layer 20B includes a larger content of the composite oxide per unit volume of the substrate as compared to that in the first catalyst layer 20A. In this case, the first catalyst layer 20A does not have to include the composite oxide.

When the second catalyst layer 20B has a larger composite oxide content as compared to that of the first catalyst layer 20A, each layer mainly plays the following role. Namely, the second catalyst layer 20B mainly contributes to adsorption and purification of $NO_x$. Furthermore, the first catalyst layer 20A mainly contributes to purification of CO and HC.

When the composite oxide content in the second catalyst layer 20B is larger than that of the first catalyst layer 20A, the following advantages become available. Namely, the second catalyst layer 20B contacts with $NO_x$ molecules in the exhaust gas more readily than the first catalyst layer 20A does. Furthermore, since the composite oxide is present in a relatively large amount in the second catalyst layer 20B, the composite oxide readily contacts with $NO_x$ molecules. Therefore, in this case, the $NO_x$ purification performance of the catalyst is improved. Furthermore, a CO molecule is relatively small in size. Therefore, it is considered that many of the CO molecules in the exhaust gas pass through the second catalyst layer 20B and react in the first catalyst layer 20A. Therefore, even in the case when the constitution as mentioned above is adopted, excellent CO purification performance can be maintained.

When the $NO_x$ purification performance of the catalyst 1 is important, the ratio of the composite oxide content in the second catalyst layer 20B with respect to the composite oxide content in the first catalyst layer 20A is adjusted to, for example, in the range of from 1.5 to 9.0, typically in the range of from 1.5 to 4.0.

Figure 4:
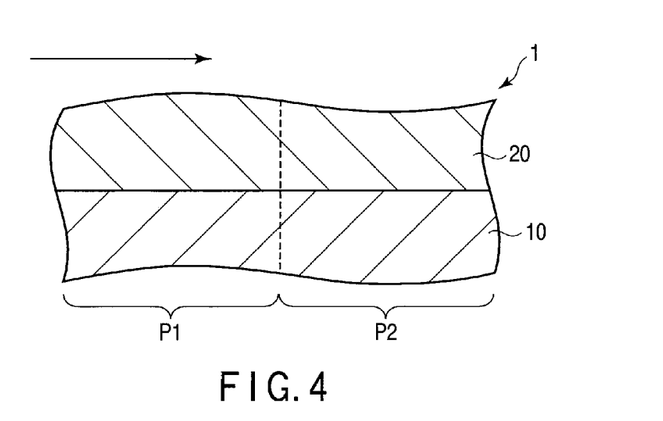
FIG. 4 is a cross-sectional view schematically showing another variation of the diesel exhaust gas purification catalyst shown in FIG. 1.

FIG. 4 is a cross-sectional view schematically showing another variation of the diesel exhaust gas purification catalyst shown in FIG. 1.

The catalyst 1 comprises a first part P1 to which exhaust gas is fed, and a second part P2 to which the exhaust gas that has passed through the first part P1 is fed. Namely, the first part P1 is positioned on the upstream side of the exhaust gas stream, and the second part P2 is positioned on the downstream side of the exhaust gas stream. The catalyst 1 is also used by disposing on the upstream side of the exhaust gas stream with respect to the denitration catalyst 2 shown in FIG. 2.

In this example, the first part P1 and the second part P2 are different from each other in the composite oxide content per unit volume. Typically, the first part P1 has a lower content of the composite oxide per unit volume as compared to that of the second part P2. In this case, the first part P1 does not have to include the composite oxide.

When the adsorption site of the composite oxide is covered by a particular material (PM) and the like emitted from a diesel engine, the $NO_x$ adsorption performance of the composite oxide is decreased. This phenomenon is particularly significant in the first part P1 positioned on the upstream side of the exhaust gas stream. Furthermore, the first part P1 has a higher heat load than that of the second part P2. Therefore, it is advantageous that the composite oxide is included in a larger content in the second part P2 positioned on the downstream side of the exhaust gas stream.

Furthermore, by purifying PM in the first part P1 of the catalyst 1 to some extent, it is possible to make a decrease in the $NO_x$ adsorption performance due to adsorption of PM, clogging by PM, and the like difficult to occur in the second part P2 that has a larger content of the composite oxide per unit volume. Furthermore, by doing so, the exhaust gas in which large amounts of CO and HC have been purified in the first part P1 is flown into the second part P2. Therefore, by adopting such a constitution, the apparent $NO_x$ adsorption performance of the denitration catalyst 2 can further be improved.

The ratio of the composite oxide content in the second part P2 relative to the composite oxide content in the first part P1 is, for example, within the range from 1.5 to 9.0, typically within the range from 4.0 to 9.0.

Figure 5:
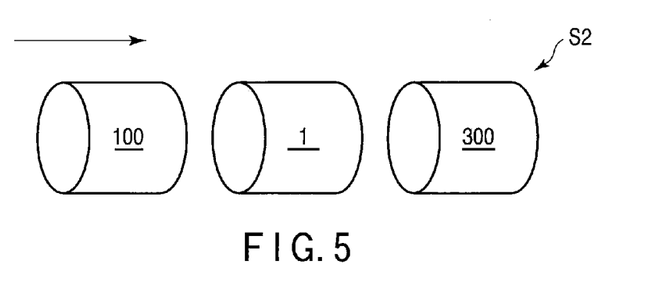
FIG. 5 is a schematic drawing showing a variation of the diesel exhaust gas purification system shown in FIG. 2.
Figure 6:
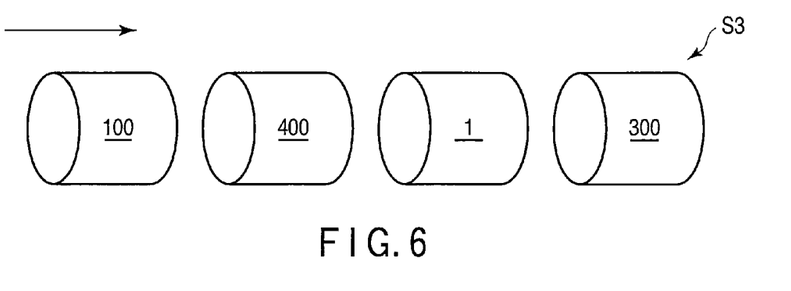
FIG. 6 is a schematic view showing another variation of the diesel exhaust gas purification system shown in FIG. 2.

FIG. 5 is a schematic drawing showing a variation of the diesel exhaust gas purification system shown in FIG. 2. FIG. 6 is a schematic view showing another variation of the diesel exhaust gas purification system shown in FIG. 2.

The system S2 shown in FIG. 5 comprises a diesel oxide catalyst 100, the diesel exhaust gas purification catalyst 1 to which the exhaust gas that has passed through the catalyst 100 is supplied, and a denitration catalyst 300 to which the exhaust gas that has passed through the diesel exhaust gas purification catalyst 1 is supplied. Namely, in this system S2, the diesel exhaust gas purification catalyst 1 is disposed between the diesel oxidizing catalyst 100 and the denitration catalyst 300.

Since the diesel exhaust gas purification catalyst 1 comprises the above composite oxide, it can adsorb $NO_x$ in the exhaust gas at a temperature region whose temperature being lower than the activation temperature of the denitration catalyst 300, the activation temperature being, for example, 200° C. Therefore, the $NO_x$ in the exhaust gas can be retained in the diesel exhaust gas purification catalyst 1 until the temperature of the exhaust gas is sufficiently raised. Therefore, by adopting such constitution, the apparent $NO_x$ purification performance of the denitration catalyst 300 can be improved.

Furthermore, as mentioned above, the exhaust gas that has passed through the diesel oxidizing catalyst 100 is supplied to the diesel exhaust gas purification catalyst 1. In this case, the exhaust gas in which PM has been at least partially removed by the diesel oxidizing catalyst 100 is supplied to the diesel exhaust gas purification catalyst 1. Therefore, a decrease in the $NO_x$ adsorption performance of the diesel exhaust gas purification catalyst 1 due to adsorption of PM, clogging by PM, and the like is difficult to occur. Namely, the apparent $NO_x$ adsorption performance of the denitration catalyst 300 can be improved.

The system S3 shown in FIG. 6 further comprises a diesel particulate filter (DPF) 400. The DPF plays a role to purify the PM emitted from the diesel engine. As the DPF, for example, a wall-flow type honeycomb is used.

In the system S3, the DPF 400 is disposed between the diesel oxidizing catalyst 100 and the diesel exhaust gas purification catalyst 1. In the system S3, the exhaust gas passes the DPF 400 before it is supplied to the diesel exhaust gas purification catalyst 1. Therefore, the PM emitted from the diesel engine is purified not only by the diesel oxidizing catalyst 100 but by the DPF 400. Therefore, a decrease in the $NO_x$ adsorption performance of the diesel exhaust gas purification catalyst 1 due to adsorption of PM and the like is further difficult to occur. Namely, the apparent $NO_x$ adsorbing performance of the denitration catalyst 300 is further improved.

In addition, the diesel exhaust gas purification system may comprise the diesel exhaust gas purification catalyst 1, the diesel oxidizing catalyst 100 to which the exhaust gas that has passed through the diesel exhaust gas purification catalyst 1 is supplied, and the denitration catalyst 300 to which the exhaust gas that has passed through the diesel oxidizing catalyst 100 is supplied. Furthermore, the system may further comprise a DPF between the diesel oxidizing catalyst 100 and the denitration catalyst 300.

EXAMPLES

Example 1

Preparation of Catalyst C1

100 g of alumina, 100 g of pure water, and a platinum nitrate solution containing 4 g of platinum were mixed. This was dried at 250° C., and calcined at 500° C. for 3 hours in air. A catalyst powder was thus obtained. Hereinafter, this is referred to as "catalyst powder A".

A composite oxide of cerium and praseodymium was prepared. The ratio of cerium in this composite oxide was adjusted to 90% by mass in terms of oxide. The specific surface area of the obtained composite oxide was 150 $m^2/g$. Hereinafter, this composite oxide is referred to as "composite oxide A".

100 g of the catalyst powder A, 50 g of the composite oxide A, 50 g of an alumina sol and 100 g of pure water were mixed to prepare a slurry. Hereinafter, this slurry is referred to as "slurry A".

A monolithic honeycomb carrier having a volume of 0.035 L was coated with the slurry A. This was dried at 250° C. for 1 hour, and calcined at 500° C. for 1 hour. A diesel exhaust gas purification catalyst was thus prepared. Hereinafter, this catalyst is referred to as "catalyst C1".

Example 2

Preparation of Catalyst C2

First, 100 g of alumina, 50 g of the composite oxide A, 50 g of an alumina sol, 100 g of pure water, and a platinum nitrate solution containing 4 g of platinum were mixed to prepare a slurry. Hereinafter, this slurry is referred to as "slurry B".

Then, a diesel exhaust gas purification catalyst was prepared in a similar manner to that explained for the catalyst C1, except that the slurry B was used instead of the slurry A. Hereinafter, this catalyst is referred to as "catalyst C2".

Example 3

Preparation of Catalyst C3 (Comparative Example)

First, 100 g of the catalyst powder A, 50 g of an alumina sol, and 100 g of pure water were mixed to prepare a slurry. Hereinafter, this slurry is referred to as "slurry C".

Then, a diesel exhaust gas purification catalyst was prepared in a similar manner to that explained for the catalyst C1, except that the slurry C was used instead of the slurry A. Hereinafter, this catalyst is referred to as "catalyst C3".

<Durability Test>

The catalysts C1 to C3 were subjected to a durability test in an electric furnace. Specifically, the catalysts C1 to C3 were heated at 750° C. for 5 hours in air.

<Evaluation of $NO_x$ Adsorption Performance>

The catalysts C1 to C3 after the durability test were pretreated by heating them to 400° C. Thereafter, these catalysts C1 to C3 were put into a lean atmosphere for 2 minutes using a model gas apparatus. Then, the $NO_x$ adsorption amounts during that time were measured. The measurements were carried out at 200° C. The results are shown in FIG. 7.

Figure 7:
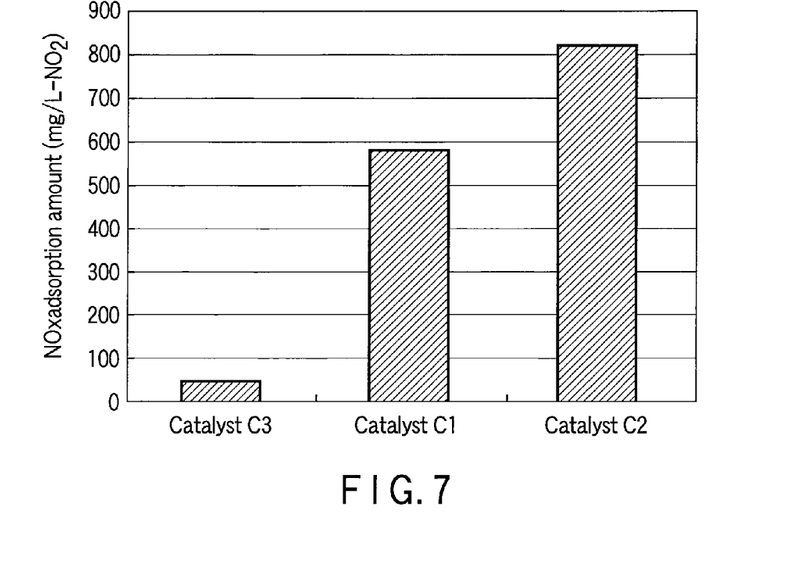
FIG. 7 is a graph showing the results of the measurements of the $NO_x$ adsorption amounts of the diesel exhaust gas purification catalysts.

FIG. 7 is a graph showing the results of the measurements of the $NO_x$ adsorption amounts of the diesel exhaust gas purification catalysts.

As is apparent from FIG. 7, the catalysts C1 and C2 showed much more excellent $NO_x$ adsorption performance as compared to that of the catalyst C3. Specifically, the catalysts C1 and C2 had $NO_x$ adsorption amounts of 500 mg/L-$NO_2$ or more in $NO_2$ conversion. These adsorption amounts are, for example, sufficient for adsorbing almost the whole amount of $NO_x$ that is emitted immediately after starting an engine. In addition, the catalyst C2 showed more excellent $NO_x$ adsorption performance as compared to the catalyst C1.

<Evaluation of Performance for Purifying HC and CO>

A model gas comprising HC and CO was flown into the catalysts C1 to C3 after the durability test while the temperature of these catalysts was raised from room temperature to 400° C. Then, the total amount of HC or CO in the inflow gas and the total amount of HC or CO in the outflow gas were obtained. Then, an HC and CO conversion was measured by calculating the difference of the total amount of HC or CO in the inflow gas and the total amount of HC or CO in the outflow gas over the total amount of HC or CO in the inflow gas. The result is shown in FIG. 8.

Figure 8:
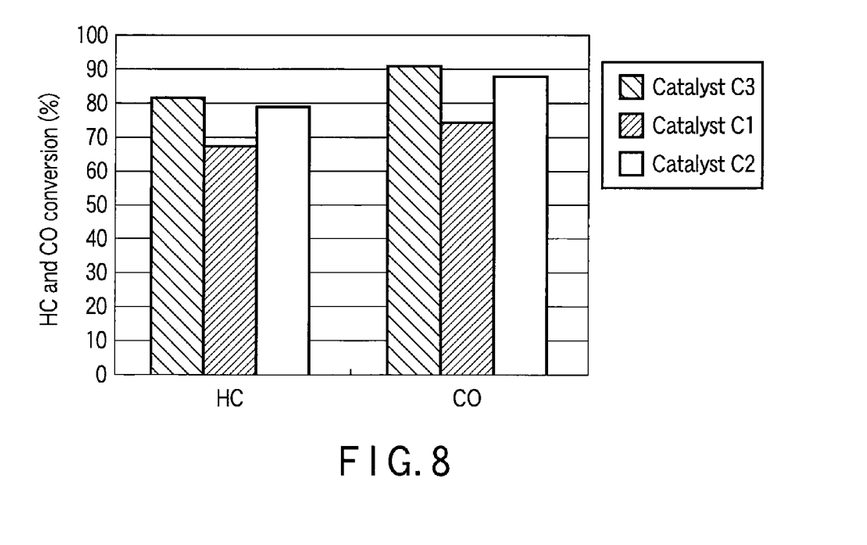
FIG. 8 is a graph showing the measurement result of the HC and CO conversion of the diesel exhaust gas purification catalysts.

FIG. 8 is a graph showing the measurement result of the HC and CO conversion of the diesel exhaust gas purification catalysts.

As is apparent from FIG. 8, the catalyst C2 showed a similar HC and CO purification performance to that of the catalyst C3. Furthermore, although the catalyst C1 had a slightly lower HC and CO conversion as compared to that of the catalyst C3, it showed excellent HC and CO purification performance.

<Evaluation of $NO_x$ Purification Performance>

Using each of the catalysts C1 to C3 after the durability test, the diesel exhaust gas purification system that has been explained with reference to FIG. 2 was prepared. Namely, systems each comprising each of the catalysts C1 to C3 and a denitration catalyst to which the exhaust gas that has passed through each of the catalysts C1 to C3 is supplied were manufactured.

Thereafter, an NO conversion was measured for each of these systems. As a result, the system using the catalyst C1 showed a higher $NO_x$ conversion as compared to the system using the catalyst C3. Furthermore, the system using the catalyst C2 showed a much higher $NO_x$ conversion as compared to the system using the catalyst C1.

From the results mentioned above, it was found that the catalysts C1 and C2 had more excellent functionality to improve the $NO_x$ purification performance of the denitration catalyst as compared to the catalyst C3. Specifically, it was found that the catalyst C2 was further excellent in this function as compared to the catalyst C1.

<<Effect of Composition of Composite Oxide>>

Example 4

Preparation of Catalyst C4

A composite oxide of cerium, lanthanum and praseodymium was prepared. The ratio of cerium in this composite oxide was adjusted to 90% by mass in terms of oxide. Furthermore, the ratio of lanthanum in this composite oxide was adjusted to 5% by mass in terms of oxide. The specific surface area of the obtained composite oxide was 180 $m^2/g$. Hereinafter, this composite was referred to as "composite oxide Ox1".

20 g of alumina, 120 g of the composite oxide Ox1, 135 g of zeolite, 100 g of an alumina sol, 100 g of pure water, and a platinum nitrate solution containing 8 g of platinum, a palladium nitrate solution containing 4 g of palladium, and a rhodium nitrate solution containing 2 g of rhodium were mixed to prepare a slurry. Hereinafter, the slurry is referred to as "slurry S1".

A monolithic honeycomb carrier having a volume of 0.035 L was coated with the slurry S1. This was dried at 250° C. for 1 hour, and calcined at 500° C. for 1 hour. A diesel exhaust gas purification catalyst was prepared in this manner. Hereinafter, this catalyst is referred to as "catalyst C4".

Example 5

Preparation of Catalyst C5

A composite oxide of cerium, lanthanum and praseodymium was prepared. The ratio of cerium in this composite oxide was adjusted to 90% by mass in terms of oxide. Furthermore, the ratio of lanthanum in this composite oxide was adjusted to 5% by mass in terms of oxide. The specific surface area of the obtained composite oxide was 100 $m^2/g$. Hereinafter, this composite was referred to as "composite oxide Ox2".

A diesel exhaust gas purification catalyst was prepared in a similar manner to that explained for the catalyst C4, except that 120 g of the composite oxide Ox2 was used instead of 120 g of the composite oxide Ox1. Hereinafter, this catalyst is referred to as "catalyst C5".

Example 6

Preparation of Catalyst C6

A composite oxide of cerium and zirconium was prepared. The ratio of cerium in this composite oxide was adjusted to 80% by mass in terms of oxide. The specific surface area of the obtained composite oxide was 80 $m^2/g$. Hereinafter, this composite was referred to as "composite oxide Ox3".

A diesel exhaust gas purification catalyst was prepared in a similar manner to that explained for the catalyst C4, except that 120 g of the composite oxide Ox3 was used instead of 120 g of the composite oxide Ox1. Hereinafter, this catalyst is referred to as "catalyst C6".

Example 7

Preparation of Catalyst C7

A composite oxide of cerium and praseodymium was prepared. The ratio of cerium in this composite oxide was adjusted to 90% by mass in terms of oxide. The specific surface area of the obtained composite oxide was 190 m²/g. Hereinafter, this composite was referred to as "composite oxide Ox4".

A diesel exhaust gas purification catalyst was prepared in a similar manner to that explained for the catalyst C4, except that 120 g of the composite oxide Ox4 was used instead of 120 g of the composite oxide Ox1. Hereinafter, this catalyst is referred to as "catalyst C7".

Example 8

Preparation of Catalyst C8

A composite oxide of cerium and lanthanum was prepared. The ratio of cerium in this composite oxide was adjusted to 90% by mass in terms of oxide. The specific surface area of the obtained composite oxide was 165 m²/g. Hereinafter, this composite was referred to as "composite oxide Ox5".

A diesel exhaust gas purification catalyst was prepared in a similar manner to that explained for the catalyst C4, except that 120 g of the composite oxide Ox5 was used instead of 120 g of the composite oxide Ox1. Hereinafter, this catalyst is referred to as "catalyst C8".

Example 9

Preparation of Catalyst C9

A composite oxide of cerium, zirconium, lanthanum, and praseodymium was prepared. The ratio of cerium in this composite oxide was adjusted to 80% by mass in terms of oxide. The ratio of zirconium in this composite oxide was adjusted to 10% by mass in terms of oxide. Further, the ratio of lanthanum in this composite oxide was adjusted to 5% by mass in terms of oxide. The specific surface area of the obtained composite oxide was 150 m²/g. Hereinafter, this composite was referred to as "composite oxide Ox6".

A diesel exhaust gas purification catalyst was prepared in a similar manner to that explained for the catalyst C4, except that 120 g of the composite oxide Ox6 was used instead of 120 g of the composite oxide Ox1. Hereinafter, this catalyst is referred to as "catalyst C9".

Example 10

Preparation of Catalyst C10

A composite oxide of cerium, praseodymium, and neodymium was prepared. The ratio of cerium in this composite oxide was adjusted to 90% by mass in terms of oxide. The ratio of praseodymium in this composite oxide was adjusted to 5% by mass in terms of oxide. The specific surface area of the obtained composite oxide was 145 m²/g. Hereinafter, this composite was referred to as "composite oxide Ox7".

A diesel exhaust gas purification catalyst was prepared in a similar manner to that explained for the catalyst C4, except that 120 g of the composite oxide Ox7 was used instead of 120 g of the composite oxide Ox1. Hereinafter, this catalyst is referred to as "catalyst C10".

Example 11

Preparation of Catalyst C11

A composite oxide of cerium, praseodymium, and yttrium was prepared. The ratio of cerium in this composite oxide was adjusted to 90% by mass in terms of oxide. The ratio of praseodymium in this composite oxide was adjusted to 5% by mass in terms of oxide. The specific surface area of the obtained composite oxide was 130 m²/g. Hereinafter, this composite was referred to as "composite oxide Ox8".

A diesel exhaust gas purification catalyst was prepared in a similar manner to that explained for the catalyst C4, except that 120 g of the composite oxide Ox8 was used instead of 120 g of the composite oxide Ox1. Hereinafter, this catalyst is referred to as "catalyst C11".

Example 12

Preparation of Catalyst C12

A composite oxide of cerium and praseodymium was prepared. The specific surface area of the obtained composite oxide was 180 m²/g. Hereinafter, this composite was referred to as "composite oxide Ox9".

A diesel exhaust gas purification catalyst was prepared in a similar manner to that explained for the catalyst C4, except that 78 g of the composite oxide Ox9, 6 g of barium acetate (the weight in terms of $BaO_2$), and 30 g of alumina were used instead of 120 g of the composite oxide Ox1. Hereinafter, this catalyst is referred to as "catalyst C12".

<Durability Test>

Each of the catalysts C4 to C12 was subjected to a similar durability test to that mentioned previously for the catalysts C1 to C3.

<Evaluation of $NO_x$ Adsorption Performance>

The $NO_x$ adsorption performances of the catalysts C4 to C12 after the durability test were evaluated by a similar method to that mentioned previously for the catalysts C1 to C3.

<Evaluation of Exhaust Gas Purification Performance>

The diesel exhaust gas purification systems that have been explained with reference to FIG. 2 were prepared by using each of the catalysts C4 to C12 after the durability test. Namely, systems each comprising each of the catalysts C4 to C12 and a denitration catalyst to which the exhaust gas that has passed through each of the catalysts C4 to C12 is supplied were manufactured. Thereafter, the conversions of CO, HC and $NO_x$ at 200° C. were measured for each of these systems.

<Summary>

The above-mentioned evaluation results are summarized in the following Table 1.

TABLE 1

| Catalysts | Noble Metals Pt (g/L) | Pd (g/L) | Rh (g/L) | Ce (mass %) | Zr (mass %) | La (mass %) | Pr (mass %) | Nd (mass %) | Y (mass %) | Form | SSA (m²/g) | Ba (mass %) | Al (mass %) | The Whole Content (mass %) | Zeolite (mass %) | Position | NOx adsorption amount (mg/L-NO₂) | Conversion (%) CO | HC | NOx |
|---|---|---|---|---|---|---|---|---|---|---|---|---|---|---|---|---|---|---|---|---|
| C4 | 2 | 1 | 0.5 | 90 | — | 5 | 5 | — | — | SS | 180 | — | — | 40 | 45 | Upstream | 600 | 75 | 80 | 80 |
| C5 | 2 | 1 | 0.5 | 90 | — | 5 | 5 | — | — | SS | 100 | — | — | 40 | 45 | Upstream | 110 | 80 | 81 | 17 |
| C6 | 2 | 1 | 0.5 | 80 | 20 | — | — | — | — | SS | 80 | — | — | 40 | 45 | Upstream | 50 | 77 | 83 | 15 |
| C7 | 2 | 1 | 0.5 | 90 | — | — | 10 | — | — | SS | 190 | — | — | 40 | 45 | Upstream | 535 | 74 | 78 | 73 |
| C8 | 2 | 1 | 0.5 | 90 | — | 10 | — | — | — | SS | 165 | — | — | 40 | 45 | Upstream | 360 | 76 | 83 | 55 |
| C9 | 2 | 1 | 0.5 | 80 | 10 | 5 | 5 | — | — | SS | 150 | — | — | 40 | 45 | Upstream | 500 | 78 | 80 | 58 |
| C10 | 2 | 1 | 0.5 | 90 | — | — | 5 | 5 | — | SS | 145 | — | — | 40 | 45 | Upstream | 630 | 70 | 81 | 85 |
| C11 | 2 | 1 | 0.5 | 90 | — | — | 5 | — | 5 | SS | 130 | — | — | 40 | 45 | Upstream | 450 | 71 | 79 | 50 |
| C12 | 2 | 1 | 0.5 | 65 | — | — | 5 | — | — | SS | 180 | 5 | 25 | 40 | 45 | Upstream | 700 | 68 | 75 | 90 |

Table 1 is a table in which the physical properties of the catalyst C4 to C12 are summarized. In Table 1, in the respective columns of "Noble Metals", the mass of the noble metal per unit volume of the substrate is described. In Table 1, in the column of "Position", the positional relationship between each catalyst and the denitration catalyst is described. For example, the "Upstream" in this column means that each catalyst is disposed on the upstream side of the exhaust gas stream with respect to the denitration catalyst. Furthermore, in Table 1, in the column of "SSA", the specific surface area of the composite oxide included in each catalyst is described. In addition, in Table 1, the "SS" means that the composite oxide forms a solid solution.

As is apparent from Table 1, when the composite oxide containing cerium and praseodymium was used, particularly excellent $NO_x$ adsorption performance and $NO_x$ purification performance could be achieved. Furthermore, when the composite oxide having a specific surface area of 130 m²/g or more was used, a specifically excellent $NO_x$ adsorption performance and $NO_x$ purification performance could be achieved. In addition, it was found that the $NO_x$ adsorption performance and $NO_x$ purification performance can be improved by further incorporating barium. This is assumed to be because barium has a function to chemically adsorb $NO_x$.

<<Effect of Coating Composition>>

Example 13

Preparation of Catalyst C13

A diesel exhaust gas purification catalyst was prepared in a similar manner to that explained for the catalyst C4, except that 30 g of the composite oxide Ox1 was used instead of 120 g of the composite oxide Ox1, and 225 g of zeolite was used instead of 200 g of zeolite. Hereinafter, this catalyst is referred to as "catalyst C13".

Example 14

Preparation of Catalyst C14

A diesel exhaust gas purification catalyst was prepared in a similar manner to that explained for the catalyst C4, except that 105 g of the composite oxide Ox1 was used instead of 120 g of the composite oxide Ox1, and 150 g of zeolite was used instead of 200 g of zeolite. Hereinafter, this catalyst is referred to as "catalyst C14".

Example 15

Preparation of Catalyst C15

A diesel exhaust gas purification catalyst was prepared in a similar manner to that explained for the catalyst C4, except that 180 g of the composite oxide Ox1 was used instead of 120 g of the composite oxide Ox1, and 75 g of zeolite was used instead of 200 g of zeolite. Hereinafter, this catalyst is referred to as "catalyst C15".

Example 16

Preparation of Catalyst C16

A diesel exhaust gas purification catalyst was prepared in a similar manner to that explained for the catalyst C4, except that 225 g of the composite oxide Ox1 was used instead of 120 g of the composite oxide Ox1, and the use of zeolite was omitted. Hereinafter, this catalyst is referred to as "catalyst C16".

<Durability Test>

Each of the catalysts C13 to C16 was subjected to a similar durability test to that mentioned previously for the catalysts C1 to C3.

<Evaluation of $NO_x$ Adsorption Performance>

The $NO_x$ adsorption performances of the catalysts C13 to C16 after the durability test were evaluated by a similar method to that mentioned previously for the catalysts C1 to C3.

<Evaluation of Exhaust Gas Purification Performance>

The diesel exhaust gas purification system that has been explained with reference to FIG. 2 was prepared by using each of the catalysts C13 to C16 after the durability test. Namely, systems each comprising each of the catalysts C13 to C16 and a denitration catalyst to which the exhaust gas that has passed through each of the catalysts C13 to C16 is supplied were manufactured. Thereafter, the conversions of CO, HC and $NO_x$ at 200° C. were measured for each of these systems in a similar manner to that explained previously for the systems comprising the catalysts C4 to C12.

<Summary>

The above-mentioned evaluation results are summarized in the following Table 2.

TABLE 2

| | Noble Metals | | | Composite Oxides | | | | | Zeolite | | $NO_x$ adsorption | Conversion | | |
|---|---|---|---|---|---|---|---|---|---|---|---|---|---|---|
| | Pt | Pd | Rh | Ce | La | Pr | | SSA | Content | | | amount | (%) | | |
| Catalysts | (g/L) | (g/L) | (g/L) | (mass %) | (mass %) | (mass %) | Form | (m²/g) | (mass %) | (mass %) | Position | (mg/L-NO₂) | CO | HC | $NO_x$ |
| C13 | 2 | 1 | 0.5 | 90 | 5 | 5 | SS | 180 | 10 | 75 | Upstream | 60 | 65 | 85 | 20 |
| C14 | 2 | 1 | 0.5 | 90 | 5 | 5 | SS | 180 | 35 | 50 | Upstream | 300 | 70 | 85 | 60 |
| C4 | 2 | 1 | 0.5 | 90 | 5 | 5 | SS | 180 | 40 | 45 | Upstream | 600 | 75 | 80 | 80 |
| C15 | 2 | 1 | 0.5 | 90 | 5 | 5 | SS | 180 | 60 | 25 | Upstream | 650 | 55 | 45 | 65 |
| C16 | 2 | 1 | 0.5 | 90 | 5 | 5 | SS | 180 | 85 | 0 | Upstream | 670 | 35 | 20 | 50 |

Table 2 is a table in which the physical properties of the catalysts C13 to C16 and the catalyst C4 are summarized. The meanings of the respective descriptions in Table 2 are the same to those in Table 1.

As is apparent from Table 2, when the content of zeolite was increased, the HC purification performance was improved.

Effect of Constitution of Catalyst Layer

Example 17

Preparation of Catalyst C17

10 g of alumina, 90 g of the composite oxide Ox1, 67.5 g of zeolite, 50 g of an alumina sol, 50 g of pure water, and a platinum nitrate solution containing 4 g of platinum, a palladium nitrate solution containing 2 g of palladium, and a rhodium nitrate solution containing 1 g of rhodium were mixed to prepare a slurry. Hereinafter, the slurry is referred to as "slurry S2".

A slurry was prepared in a similar manner to that for the slurry S2, except that 30 g of the composite oxide Ox1 was used instead of 90 g of the composite oxide Ox1. Hereinafter, the slurry is referred to as "slurry S3".

A monolithic honeycomb carrier having a volume of 0.035 L was coated with the slurry A. This was dried at 250° C. for 1 hour, and calcined at 500° C. for 1 hour. A first catalyst layer was thus formed on a substrate.

Thereafter the first catalyst layer was coated with the slurry S3. This was dried at 250° C. for 1 hour, and calcined at 500° C. for 1 hour. A second catalyst layer was thus formed on the first catalyst layer.

A diesel exhaust gas purification catalyst was prepared in the manner mentioned above. Hereinafter, this catalyst is referred to as "catalyst C17".

Example 18

Preparation of Catalyst C18 (Reference Example)

A slurry was prepared in a similar manner to that for the slurry S2, except that 60 g of the composite oxide Ox1 was used instead of 90 g of the composite oxide Ox1. Hereinafter, the slurry is referred to as "slurry S4".

A diesel exhaust gas purification catalyst was prepared in a similar manner to that for the catalyst C17, except that the slurry S4 was used instead of the slurries S2 and S3. Hereinafter, this catalyst is referred to as "catalyst C18".

Example 19

Preparation of Catalyst C19

A diesel exhaust gas purification catalyst was prepared in a similar manner to that for the catalyst C17, except that the slurry S2 was used instead of the slurry S3, and the slurry S3 was used instead of the slurry S2. Hereinafter, this catalyst is referred to as "catalyst C19".

Example 20

Preparation of Catalyst C20

A monolithic honeycomb carrier substrate having a volume of 0.035 L was coated with the slurry S3 up to the position at 50% from the upstream end of the substrate, and dried at 250° C. for 1 hour. The substrate was then coated with the slurry S2 up to the position at 50% from the downstream end of the substrate, and dried at 250° C. for 1 hour. The obtained was then calcined at 500° C. for 1 hour. A diesel exhaust gas purification catalyst was manufactured in this manner. Hereinafter, this catalyst is referred to as "catalyst C20".

Example 21

Preparation of Catalyst C21 (Reference Example)

A diesel exhaust gas purification catalyst was prepared in a similar manner to that for the catalyst C20, except that the slurry S4 was used instead of the slurries S2 and S3. Hereinafter, this catalyst is referred to as "catalyst C21".

Example 22

Preparation of Catalyst C22

A diesel exhaust gas purification catalyst was prepared in a similar manner to that for the catalyst C20, except that the slurry S2 was used instead of the slurry S3, and the slurry S3 was used instead of the slurry S2. Hereinafter, this catalyst is referred to as "catalyst C22".

<Durability Test>

Each of the catalysts C17 to C22 was subjected to a similar durability test to that mentioned previously for the catalysts C1 to C3.

<Evaluation of $NO_x$ Adsorption Performance>

The $NO_x$ adsorption performances of the catalysts C17 to C22 after the durability test were evaluated by a similar method to that mentioned previously for the catalysts C1 to C3.

<Evaluation of Exhaust Gas Purification Performance>

The diesel exhaust gas purification system that has been explained with reference to FIG. 2 was prepared by using each of the catalysts C17 to C22 after the durability test. Namely, systems each comprising each of the catalysts C17 to C22 and a denitration catalyst to which the exhaust gas that has passed through each of the catalysts C17 to C22 is supplied were manufactured. Thereafter, the conversions of CO, HC and $NO_x$ at 200° C. were measured for each of these systems in a similar manner to that explained previously for the systems comprising the catalysts C4 to C12.

<Summary>

The above-mentioned evaluation results are summarized in the following Tables 3 and 4.

summarized. The meanings of the respective descriptions in Tables 3 and 4 are similar to those in Table 1.

As is apparent from Table 3, the $NO_x$ adsorption performance and $NO_x$ purification performance could be improved by increasing the composite oxide content in the second catalyst layer.

As is apparent from Table 4, the $NO_x$ adsorption performance and $NO_x$ purification performance could be improved by increasing the composite oxide content in the second part.

<<Effect of Specific Surface Area of Composite Oxide>>

Example 23

Preparation of Catalyst C23

A composite oxide of cerium, lanthanum, and praseodymium was prepared. The ratio of cerium in this composite oxide was adjusted to 90% by mass in terms of oxide. The ratio of lanthanum in this composite oxide was adjusted to 5% by mass in terms of oxide. The specific surface area of the obtained composite oxide was 120 $m^2/g$. Hereinafter, this composite was referred to as "composite oxide Ox10".

A diesel exhaust gas purification catalyst was prepared in a similar manner to that explained for the catalyst C4, except

TABLE 3

| | | Noble Metals | | | Composite Oxide | | | | | | Zeolite | | $NO_x$ | | | |
|---|---|---|---|---|---|---|---|---|---|---|---|---|---|---|---|---|
| | | Pt | Pd | Rh | Ce | La | Pr | | SSA | Content | | | adsorption | Conversion (%) | | |
| Catalysts | Layers | (g/L) | (g/L) | (g/L) | (mass %) | (mass %) | (mass %) | Form | ($m^2/$ g) | (mass %) | (mass %) | Position | amount (mg/L-$NO_2$) | CO | HC | $NO_x$ |
| C17 | Second Catalyst Layer | 1 | 0.5 | 0.25 | 90 | 5 | 5 | SS | 180 | 30 | 22.5 | Upstream | 630 | 75 | 70 | 85 |
| | First Catalyst Layer | 1 | 0.5 | 0.25 | 90 | 5 | 5 | SS | 180 | 10 | 22.5 | | | | | |
| C18 | Second Catalyst Layer | 1 | 0.5 | 0.25 | 90 | 5 | 5 | SS | 180 | 20 | 22.5 | Upstream | 600 | 75 | 80 | 80 |
| | First Catalyst Layer | 1 | 0.5 | 0.25 | 90 | 5 | 5 | SS | 180 | 20 | 22.5 | | | | | |
| C19 | Second Catalyst Layer | 1 | 0.5 | 0.25 | 90 | 5 | 5 | SS | 180 | 10 | 22.5 | Upstream | 430 | 75 | 80 | 50 |
| | First Catalyst Layer | 1 | 0.5 | 0.25 | 90 | 5 | 5 | SS | 180 | 30 | 22.5 | | | | | |

TABLE 4

| | | Noble Metals | | | Composite Oxide | | | | | | Zeolite | | $NO_x$ | | | |
|---|---|---|---|---|---|---|---|---|---|---|---|---|---|---|---|---|
| | | Pt | Pd | Rh | Ce | La | Pr | | SSA | Content | | | adsorption | Conversion (%) | | |
| Catalysts | Parts | (g/L) | (g/L) | (g/L) | (mass %) | (mass %) | (mass %) | Form | ($m^2/$ g) | (mass %) | (mass %) | Position | amount (mg/L-$NO_2$) | CO | HC | $NO_x$ |
| C20 | First Part | 1 | 0.5 | 0.25 | 90 | 5 | 5 | SS | 180 | 30 | 22.5 | Upstream | 650 | 70 | 75 | 60 |
| | Second Part | 1 | 0.5 | 0.25 | 90 | 5 | 5 | SS | 180 | 10 | 22.5 | | | | | |
| C21 | First Part | 1 | 0.5 | 0.25 | 90 | 5 | 5 | SS | 180 | 20 | 22.5 | Upstream | 610 | 70 | 75 | 80 |
| | Second Part | 1 | 0.5 | 0.25 | 90 | 5 | 5 | SS | 180 | 20 | 22.5 | | | | | |
| C22 | First Part | 1 | 0.5 | 0.25 | 90 | 5 | 5 | SS | 180 | 10 | 22.5 | Upstream | 550 | 75 | 81 | 92 |
| | Second Part | 1 | 0.5 | 0.25 | 90 | 5 | 5 | SS | 180 | 30 | 22.5 | | | | | |

Table 3 is a table in which the physical properties of the catalyst C17 to C19 are summarized. Table 4 is a table in which the physical properties of the catalyst C20 to C22 are that 120 g of the composite oxide Ox10 was used instead of 120 g of the composite oxide Ox1. Hereinafter, this catalyst is referred to as "catalyst C23".

Example 24

Preparation of Catalyst C24

A composite oxide of cerium, lanthanum, and praseodymium was prepared. The ratio of cerium in this composite oxide was adjusted to 90% by mass in terms of oxide. The ratio of lanthanum in this composite oxide was adjusted to 5% by mass in terms of oxide. The specific surface area of the obtained composite oxide was 150 m²/g. Hereinafter, this composite was referred to as "composite oxide Ox11".

A diesel exhaust gas purification catalyst was prepared in a similar manner to that explained for the catalyst C4, except that 120 g of the composite oxide Ox11 was used instead of 120 g of the composite oxide Ox1. Hereinafter, this catalyst is referred to as "catalyst C24".

Example 25

Preparation of Catalyst C25

A composite oxide of cerium, lanthanum, and praseodymium was prepared. The ratio of cerium in this composite oxide was adjusted to 90% by mass in terms of oxide. The ratio of lanthanum in this composite oxide was adjusted to 5% by mass in terms of oxide. The specific surface area of the obtained composite oxide was 210 m²/g. Hereinafter, this composite was referred to as "composite oxide Ox12".

A diesel exhaust gas purification catalyst was prepared in a similar manner to that explained for the catalyst C4, except that 120 g of the composite oxide Ox12 was used instead of 120 g of the composite oxide Ox1. Hereinafter, this catalyst is referred to as "catalyst C25".

<Durability Test>

Each of the catalysts C23 to C25 was subjected to a similar durability test to that mentioned previously for the catalysts C1 to C3.

<Evaluation of $NO_x$ Adsorption Performance>

The $NO_x$ adsorption performances of the catalysts C23 to C25 after the durability test were evaluated by a similar method to that mentioned previously for the catalysts C1 to C3.

<Evaluation of Exhaust Gas Purification Performance>

The diesel exhaust gas purification system that has been explained with reference to FIG. 2 was prepared by using each of the catalysts C23 to C25 after the durability test. Namely, systems each comprising each of the catalysts C23 to C25 and a denitration catalyst to which the exhaust gas that has passed through each of the catalysts C23 to C25 is supplied were manufactured. Thereafter, the conversions of CO, HC and $NO_x$ at 200° C. were measured for each of these systems in a similar manner to that explained previously for the systems comprising the catalysts C4 to C12.

<Summary>

The above-mentioned evaluation results are summarized in the following Table 5.

TABLE 5

| Catalysts | Noble Metals | | | Composite Oxides | | | | | Zeolite Content (mass %) | Position | $NO_x$ adsorption amount (mg/L-$NO_2$) | Conversion (%) | | |
| | Pt (g/L) | Pd (g/L) | Rh (g/L) | Ce (mass %) | La (mass %) | Pr (mass %) | Form | SSA (m²/g) | Content (mass %) | | | | CO | HC | $NO_x$ |
| --- | --- | --- | --- | --- | --- | --- | --- | --- | --- | --- | --- | --- | --- | --- | --- |
| C23 | 2 | 1 | 0.5 | 90 | 5 | 5 | SS | 120 | 40 | 45 | Upstream | 142 | 65 | 78 | 20 |
| C24 | 2 | 1 | 0.5 | 90 | 5 | 5 | SS | 150 | 40 | 45 | Upstream | 460 | 70 | 80 | 53 |
| C4 | 2 | 1 | 0.5 | 90 | 5 | 5 | SS | 180 | 40 | 45 | Upstream | 600 | 75 | 80 | 80 |
| C25 | 2 | 1 | 0.5 | 90 | 5 | 5 | SS | 210 | 40 | 45 | Upstream | 715 | 75 | 81 | 92 |

Table 5 is a table in which the physical properties of the catalysts C23 to C25 and the catalyst C4 are summarized. The meanings of the respective descriptions in Table 5 are similar to those in Table 1.

As is apparent from Table 5, the $NO_x$ adsorption performance and exhaust gas purification performance were improved by increasing the specific surface area of the composite oxide.

<<Other Comparative Examples>>

Example 26

Preparation of Catalyst C26 (Comparative Example)

A diesel exhaust gas purification catalyst was prepared in a similar manner to that explained for the catalyst C4, except that the use of noble metals was omitted. Hereinafter, this catalyst is referred to as "catalyst C26".

Example 27

Preparation of Catalyst C27 (Comparative Example)

Alumina having a specific surface area of 180 m²/g was prepared. Hereinafter, this alumina is referred to as "alumina A1".

A diesel exhaust gas purification catalyst was prepared in a similar manner to that explained for the catalyst C4, except that 120 g of the alumina A1 was used instead of 120 g of the composite oxide Ox1. Hereinafter, this catalyst is referred to as "catalyst C27".

Example 28

Preparation of Catalyst C28 (Comparative Example)

A composite oxide of cerium and aluminum was prepared. The ratio of cerium in this composite oxide was adjusted to 90% by mass in terms of oxide. The specific surface area of the obtained composite oxide was 180 m²/g. Hereinafter, this composite was referred to as "composite oxide Ox13.

A diesel exhaust gas purification catalyst was prepared in a similar manner to that explained for the catalyst C4, except that 120 g of the composite oxide Ox13 was used instead of 120 g of the composite oxide Ox1. Hereinafter, this catalyst is referred to as "catalyst C28".

Example 29

Preparation of Catalyst C29 (Comparative Example)

A diesel exhaust gas purification catalyst having a similar constitution to that of the catalyst C4 was prepared in a similar manner to that explained previously. Hereinafter, this catalyst is referred to as "catalyst 29". As mentioned below, the catalyst C29 was used by disposing it on the downstream side of the denitration catalyst.

Example 30

Preparation of Catalyst C30 (Comparative Example)

A diesel exhaust gas purification catalyst was prepared in a similar manner to that explained for the catalyst C4, except that a mixture of 108 g of cerium oxide and 6 g of lanthanum oxide and 6 g of praseodymium oxide was used instead of 120 g of the composite oxide Ox1. Hereinafter, this catalyst is referred to as "catalyst C30".

Example 31

Preparation of Catalyst C31 (Comparative Example)

Cerium oxide having a specific surface area of 150 m²/g was prepared. Hereinafter, this cerium oxide is referred to as "ceria C1".

A diesel exhaust gas purification catalyst was prepared in a similar manner to that explained for the catalyst C4, except that 120 g of the ceria C1 was used instead of 120 g of the composite oxide Ox1. Hereinafter, this catalyst is referred to as "catalyst C31".

<Durability Test>

Each of the catalysts C26 to C31 was subjected to a similar durability test to that mentioned previously for the catalysts C1 to C3.

<Evaluation of $NO_x$ Adsorption Performance>

The $NO_x$ adsorption performances of the catalysts C26 to C31 after the durability test were evaluated by a similar method to that mentioned previously for the catalysts C1 to C3.

<Evaluation of Exhaust Gas Purification Performance>

The diesel exhaust gas purification system that has been explained with reference to FIG. 2 was prepared by using each of the catalysts C26 to C28 and C30 and C31 after the durability test. Namely, systems each comprising each of the catalysts C26 to C28 and C30 and C31 and a denitration catalyst to which the exhaust gas that has passed through each of the catalysts C26 to C28 and C30 and C31 is supplied were prepared. Furthermore, for comparison, a system comprising a denitration catalyst and the catalyst 29 to which the exhaust gas that has passed through the denitration catalyst is supplied was prepared. Thereafter, the conversions of CO, HC and $NO_x$ at 200° C. were measured for each of these systems in a similar manner to that explained previously for the systems comprising the catalysts C4 to C12.

<Summary>

The above-mentioned evaluation results are summarized in the following Table 6.

TABLE 6

| Catalysts | Noble Metals | | | Composite Oxides/Cerium Oxides | | | | | SSA | Content | Zeolite | | $NO_x$ adsorption | Conversion (%) | | |
|---|---|---|---|---|---|---|---|---|---|---|---|---|---|---|---|---|
| | Pt (g/L) | Pd (g/L) | Rh (g/L) | Ce (mass %) | La (mass %) | Pr (mass %) | Al (mass %) | Form | (m²/g) | (mass %) | (mass %) | Position | amount (mg/L-NO₂) | CO | HC | $NO_x$ |
| C26 | — | — | — | 90 | 5 | 5 | — | SS | 180 | 40 | 45 | Upstream | 30 | 0 | 20 | 5 |
| C27 | 2 | 1 | 0.5 | — | — | — | — | — | — | — | 45 | Upstream | 40 | 70 | 80 | 10 |
| C28 | 2 | 1 | 0.5 | 90 | — | — | 10 | SS | 180 | 40 | 45 | Upstream | 330 | 75 | 80 | 35 |
| C29 | 2 | 1 | 0.5 | 90 | 5 | 5 | — | SS | 180 | 40 | 45 | Downstream | 600 | 65 | 68 | 40 |
| C30 | 2 | 1 | 0.5 | 90 | 5 | 5 | — | MIX | 180 | 40 | 45 | Upstream | 285 | 70 | 80 | 33 |
| C31 | 2 | 1 | 0.5 | 100 | — | — | — | — | 150 | 40 | 45 | Upstream | 350 | 68 | 77 | 38 |

Table 6 is a table in which the physical properties of the catalysts C26 to C31 and the catalyst C4 are summarized. In Table 6, the "MIX" means that a mixture of a plurality of oxides was used. The meanings of other descriptions in Table 6 are similar to those in Table 1.

As is apparent from Table 6, when the noble metal was omitted, the $NO_x$ adsorption amount and exhaust gas purification performance were low. When cerium was omitted, the $NO_x$ adsorption amount and performances for purifying CO and $NO_x$ were low. When the composite oxide of cerium and an element other than Group III and/or Group IV was used, the $NO_x$ adsorption amount and performance for purifying $NO_x$ were low. When the catalyst was disposed on the downstream side of the denitration catalyst, the exhaust gas purification performance was low. When the mixture of a plurality of oxides was used instead of the composite oxide, the $NO_x$ adsorption amount and performance for purifying $NO_x$ were low. In addition, when the single oxide of cerium was used instead of the composite oxide, the $NO_x$ adsorption amount and exhaust gas purification performance were low.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A diesel exhaust gas purification catalyst, comprising:
  a substrate; and
  a catalyst layer formed on the substrate, the catalyst layer comprising a carrier, a noble metal and/or an oxide thereof supported by the carrier, and a composite oxide of cerium and one or more Group III and/or Group IV elements, wherein the catalyst when in use is disposed on an upstream side of an exhaust gas stream with respect to a denitration catalyst, the composite oxide has a specific surface area of 150 m$^2$/g or more, and the composite oxide further contains barium and/or aluminum.

2. The diesel exhaust gas purification catalyst according to claim 1, comprising:
a first part to which exhaust gas is fed; and
a second part to which the exhaust gas that has passed through the first part is fed,
wherein the first part comprises a smaller content of the composite oxide per unit volume than that of the second part.

3. The diesel exhaust gas purification catalyst according to claim 1, the catalyst layer comprising:
a first catalyst layer formed on the substrate; and
a second catalyst layer formed on the first layer, the second catalyst layer comprising a larger content of the composite oxide per unit volume than that of the first catalyst layer.

4. The diesel exhaust gas purification catalyst according to claim 1, wherein the composite oxide comprises the Group III element, and the Group III element is a lanthanoid and/or an actinoid.

5. The diesel exhaust gas purification catalyst according to claim 1, wherein the composite oxide comprises the Group III element, and the Group III element is lanthanum and/or praseodymium.

6. The diesel exhaust gas purification catalyst according to claim 1, wherein the ratio of the cerium in the composite oxide is in the range of from 55% to 95% by mass in terms of oxides.

7. The diesel exhaust gas purification catalyst according to claim 1, wherein the catalyst layer further comprises zeolite.

8. A diesel exhaust gas purification system, comprising:
the diesel exhaust gas purification catalyst according to claim 1; and
a denitration catalyst to which exhaust gas that has passed through the diesel exhaust gas purification catalyst is fed.

9. A diesel exhaust gas purification system, comprising:
a diesel oxidizing catalyst;
the diesel exhaust gas purification catalyst according to claim 1 to which exhaust gas that has passed through the diesel oxidizing catalyst is fed; and
a denitration catalyst to which the exhaust gas that has passed through the diesel exhaust gas purification catalyst is fed.

10. The diesel exhaust gas purification system according to claim 9, further comprising a diesel particulate filter between the diesel oxidizing catalyst and the diesel exhaust gas purification catalyst.

* * * * *